United States Patent
Glownia et al.

(10) Patent No.: US 6,636,290 B1
(45) Date of Patent: *Oct. 21, 2003

(54) METHODS OF FORMING LIQUID DISPLAY PANELS AND THE LIKE WHEREIN USING TWO-COMPONENT EPOXY SEALANT

(75) Inventors: James Henry Glownia, Somers, NY (US); Gareth Geoffrey Hougham, Ossining, NY (US); Eric Gerhard Liniger, Danbury, CT (US); Robert Jacob Von Gutfeld, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/307,887
(22) Filed: May 10, 1999
(51) Int. Cl.[7] ............ G02F 1/13; G02F 1/1339
(52) U.S. Cl. ............ 349/187; 349/153; 349/190
(58) Field of Search ............ 349/187, 153, 349/190, 154, 156

(56) References Cited

U.S. PATENT DOCUMENTS

| | | | | |
|---|---|---|---|---|
| 5,793,461 A | * | 8/1998 | Inou | 349/153 |
| 6,055,035 A | * | 4/2000 | von Gutfeld et al. | 349/187 |
| 6,219,126 B1 | * | 4/2001 | Von Gutfeld | 349/153 |
| 6,222,603 B1 | * | 4/2001 | Sakai et al. | 349/153 |
| 6,404,479 B2 | * | 6/2002 | Zhang et al. | 349/152 |

* cited by examiner

Primary Examiner—Robert H. Kim
Assistant Examiner—Mike Qi
(74) Attorney, Agent, or Firm—Casey P. August; Jon A. Gibbons; Fleit, Kain, Gibbons, Gutman & Bongini P.L.

(57) ABSTRACT

Liquid crystal display (LCD) panels can be formed rapidly by this method, which involves depositing liquid crystal (LC) in a central region of one substrate, depositing a fillet of epoxy material in a continuous loop along the periphery of one substrate to surround the LC material, placing a second glass substrate over the first substrate and in continuous contact with the epoxy fillet, and then causing the fillet to set by curing or cross-linking. Advantageously, the epoxy fillet can be hardened by scanning it with an infrared or ultraviolet laser focussed to avoid heating the LC material. Alternatively, the epoxy fillet can be formed from two-component epoxy by depositing one fillet of each component on the peripheral region of one of the substrates, joining the substrates to merge the two components, and then vibrating the joined substrates to enhance commingling and setting of the two components into a strong hermetic seal.

11 Claims, 5 Drawing Sheets

METHODS OF FORMING LIQUID DISPLAY PANELS AND THE LIKE WHEREIN USING TWO-COMPONENT EPOXY SEALANT

FIELD OF THE INVENTION

The invention relates generally to formation of structures by joining together two opposing substrates, generally of similar geometry, and to methods to affix one to the another so that any additional material in contact with the structure remains unaffected both during and after assembly and sealing processes. A principal application of the invention is the formation of liquid crystal display panels, wherein a quantity of liquid crystal material is sealed between a pair of opposing substrates (e.g. flat glass panels).

The structure may, for example, encapsulate a second material such as a liquid or solid (e.g. liquid crystal material), by joining the pair of structures with a sealant. When the second material is temperature sensitive, the sealant must be such that it or cures or cross links at or near ambient temperature. In particular, this invention focuses in the main on the assembly of flat panel displays. In this preferred utilization, the liquid crystal of the display is contained within a central region of one substrate of the panel assembly before the plate is affixed by a fillet of sealant to the second substrate with the liquid held in place by a peripheral dam or wall. Affixing the second plate to the first causes the liquid crystal to be encapsulated within the display panel assembly, the assembly held together with a sealant applied at the peripheral region of a substrate. For example, the dam may also act as the sealant. Both the dam and the sealant should preferably comprise materials that do not contaminate the liquid crystal at any time.

BACKGROUND OF THE INVENTION

A preferred method of assembly of flat panel displays entails the use of the "one drop technique" described in U.S. Pat. No. 5,263,888 issued on Nov. 23, 1993 to Teruhisa Ishihara et al. Another method that utilizes filling of one panel plate with liquid crystal prior to assembly with the second panel has been described by von Gutfeld in U.S. patent application Ser. No. 09/197,004, filed Nov. 20, 1998. However, in both cited cases there still exists the problem of containing the liquid crystal material by a non-contaminating peripheral dam wall during filling and attachment to the second plate. Prior to the plate assembly, the dam wall must be somewhat higher than the final level of the liquid crystal material. Therefore, the dam must ultimately have the following properties: 1) be compressible to conform to the appropriate assembled display plate separation, 2) consist of a material that does not interact substantially with the liquid crystal material both during filling of the panel and after assembly and 3) the dam as well as the edge sealant must cure at a temperature or in a manner that does not damage the liquid crystal. Although, in many cases, uv (ultraviolet)-setting epoxy is presently being used to form the dam wall and serve as the sealant, there are problems caused by components of these epoxies leaching into the liquid crystal and thus causing panel performance problems.

In addition, there are regions of the peripheral seal that are not accessible by the uv radiation. Therefore, there may remain some regions that are not fully cured and thus give rise to long term liquid crystal contamination, causing certain peripheral pixels of the display to fail.

SUMMARY OF THE INVENTION

The main object of this invention is to provide means for sealing together two opposing substrates with a quantity of a second material (e.g. liquid crystal) encapsulated between them, without physical or chemical damage to the encapsulated material. The invention provides different methods for enhancing the curing or setting of sealants such as epoxies without damaging the encapsulated material.

Broadly, the present invention provides a method of forming a liquid crystal ("LC") display panel by joining a first substrate to a second substrate, each substrate having a central region surrounded by a peripheral region, said method comprising the steps of:

a) depositing a fillet of settable epoxy sealant material in a continuous loop on a peripheral region of said first substrate to surround the central region thereof, b) depositing a selected quantity of liquid crystal material in a central region of one of said first substrate and said second substrate, c) placing said second substrate with the peripheral region thereof disposed over the peripheral region of said first substrate and in continuous contact with said fillet along the entire length thereof, and d) causing setting of the aforesaid fillet of epoxy sealant material to hermetically seal said LC material between said first substrate to said second substrate .

According to a preferred embodiment, step (d) comprises vibrating the first and second substrates to enhance setting of the aforesaid epoxy sealant material, as by curing, cross-linking, or the like.

Alternatively, step (d) may be carried out by scanning along the aforesaid continuous loop of the aforesaid fillet with a focussed beam of a laser (of an ultraviolet, visible, or infrared characteristic wavelength range) to enhance setting (by curing or cross-linking) of the epoxy sealant material, preferably along a peripheral edge of the LC panel. Instead of scanning, a stationary laser (e.g. a pulsed excimer uv laser) may be used to irradiate a linear segment of the fillet of sealant material.

According to a preferred embodiment, step (d) may comprise a step of irradiating the fillet of epoxy sealant material with infrared radiation through a mask that shields the LC material.

While single-component epoxy sealant materials may be used, according to another preferred embodiment, the epoxy sealant material comprises two components, while step (a) comprises depositing fillets of said two components on the peripheral regions of the respective first and second substrates. In this case, step (d) preferably comprises vibrating the first and second substrates to enhance interdiffusion between the aforesaid two components of epoxy sealant material, as by moving an ultrasonic transducer along the continuous loop of the aforesaid fillet of epoxy sealant material.

According to another embodiment, the aforeaid fillet has an aperture to permit escape of a portion of said LC material, and the aperture is sealed with a plug of settable epoxy material, and then the plug is irradiated with a focussed beam of a laser to cure said plug.

According to yet another preferred embodiment, a barrier fillet is deposited in a continuous loop between the LC material and the fillet of epoxy sealant material to prevent contact between the LC material and said epoxy sealant material.

DETAILED DESCRIPTION OF THE INVENTION

Figure 1:
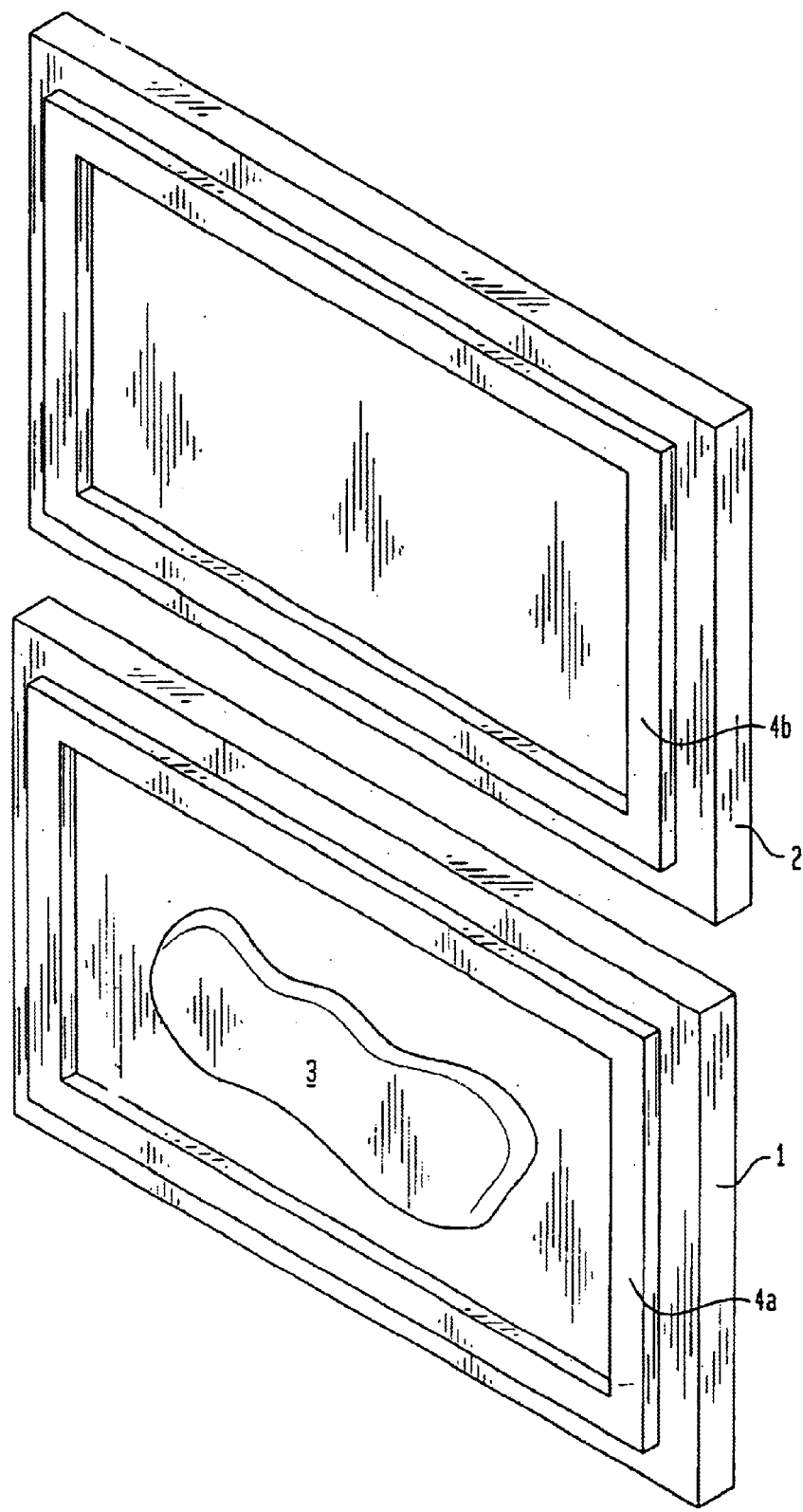
FIG. 1 is a schematic perspective view illustrating steps in the formation of a liquid crystal display (LCD) panel in accordance with one embodiment of the present invention wherein two substrate plates of equal size are used, each substrate having a peripheral fillet of one part of a two part epoxy.
Figure 2:
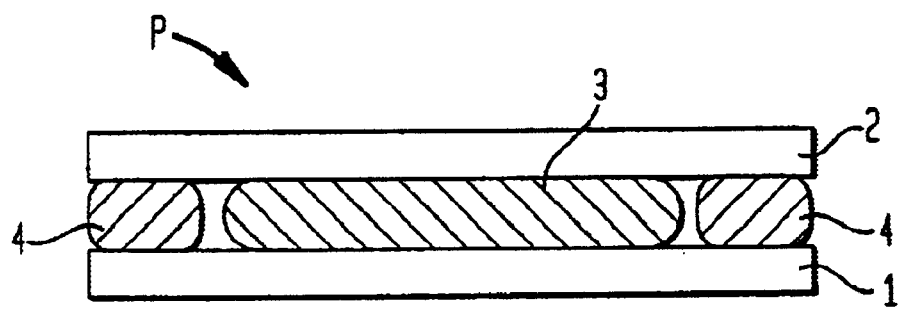
FIG. 2 is a schematic view, in cross-section, of the two substrates of FIG. 1 after they are joined together to compress and intermix the two portions of the epoxy, with the liquid encapsulated in the central regions of the substrates, surrounded by a continuous fillet of epoxy material.

To illustrate the method of the present invention for forming an LCD panel, FIG. 1 shows a first substrate 1 and a second substrate 2, preferably with at least one substrate being made of glass that is transparent to the spectrum from near infrared to near ultraviolet. A quantity of LC material 3 is to be deposited in a central region of one of the substrates and a continuous loop of settable epoxy material (to be formed in this 2-component epoxy embodiment from fillets 4a, 4b) is to be disposed in a peripheral region of each substrate to surround the central region.

Where an epoxy sealant material is chosen which is formed from two components, a fillet 4a of one epoxy component is deposited in the peripheral region of substrate 1 and a fillet 4b of a second epoxy component is deposited in the peripheral region of substrate 2. The LC material 3 is deposited (e.g. by a "one-drop-fill" method ) in the central region of substrate 1. Substrate 2 is then placed over substrate 1 to form LCD panel P, with fillet 4a in continuous contact along its entire length with fillet 4b . Under pressure between substrates 1, 2 the fillets 4a, 4b will merge together into a continuous loop 4 of epoxy sealant and will intermingle and interdiffuse to cause setting into a strong hermetic seal between substrates 1, 2, as shown in cross-section by FIG. 2.

Figure 3:
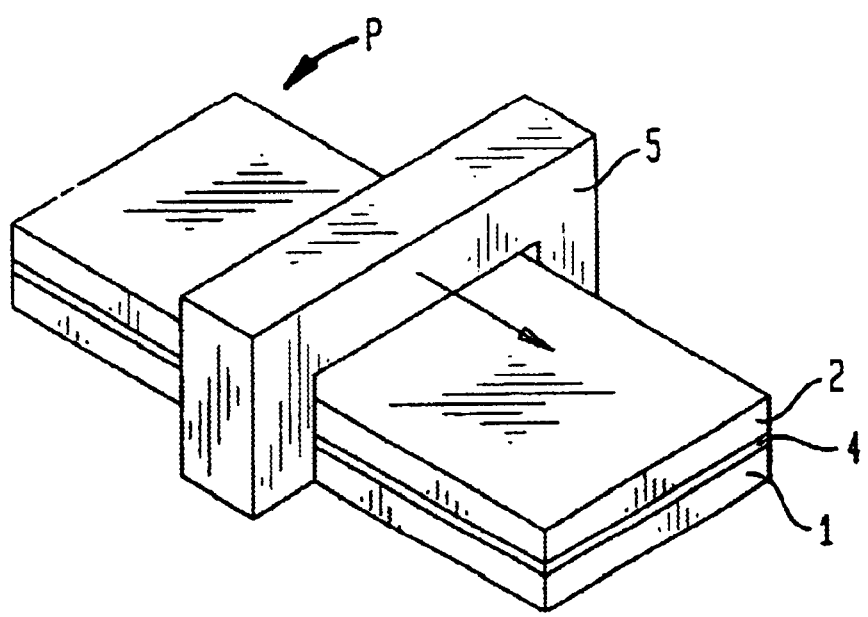
FIG. 3 is a schematic perspective view of a step of vibrating the substrates of FIG. 2 using a vibrator device to enhance inter-diffusion of the two part epoxy sealant.

In one preferred embodiment, the inter-diffusion of epoxy component fillets 4a, 4b can be enhanced by the use of an electric vibrator device 5, as illustrated in FIG. 3. Vibrator device 5 may vibrate at a small amplitude but in a frequency range greater than 100 Hz, preferably in the kHz range. The vibrator device 5 may, for example, be moved in the arrowed direction over the joined substrates 1, 2, which form LCD panel P, to cause intermingling of epoxy component fillet 4a with fillet 4b to increase the setting into a strong sealant fillet 4. Vibrator device 5 may, for example, contain piezoelectric or electromagnetic transducers to cause shaking of the entire panel P to facilitate greater intermixing of epoxy components. Alternatively, device 5 may simply comprise a clamp for fixedly gripping panel P, in which case a vibrating arm may attach to device 5 to cause shaking of panel P.

Alternatively, enhanced mixing can also be achieved by using a low frequency ultrasonic transducer, operating also in the kHz range and swept along only around the peripheral region of substrates 1, 2 above the epoxy fillet 4.

Figure 4:
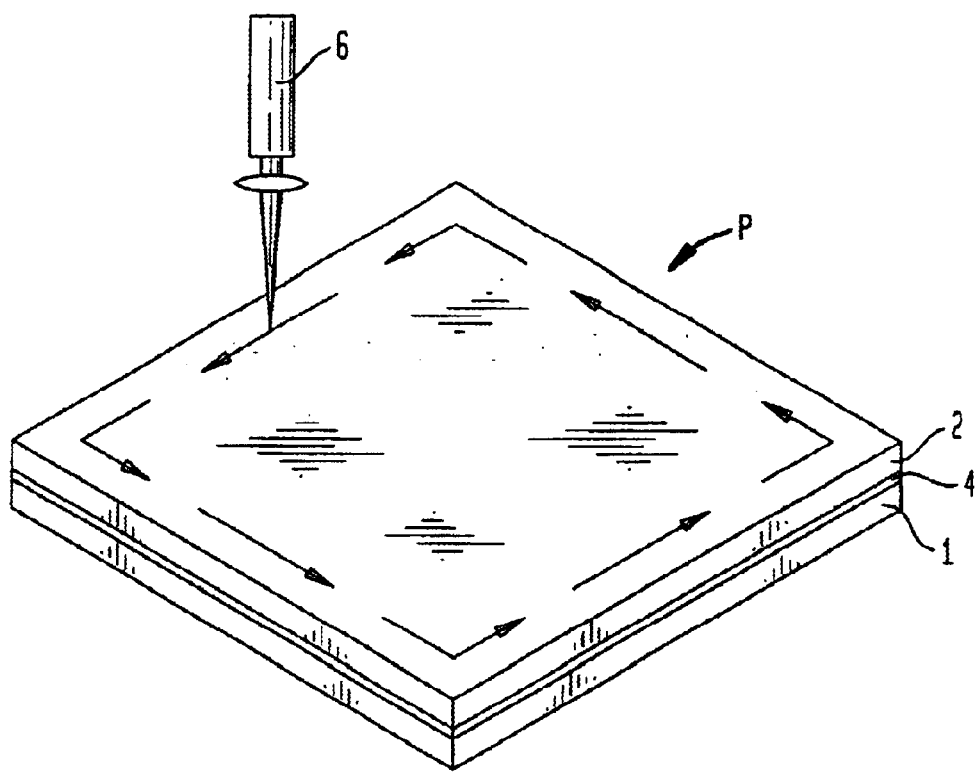
FIG. 4 is a schematic perspective view of a step of using a laser to scan the peripheral fillet of epoxy material of FIG. 2 through one of the substrates in order to enhance setting of the epoxy through heating to provide cross-linking.

Another means to enhance setting of the epoxy fillet 4 is by using a pulsed or continuous wave (cw) laser 6 to scan along the arrowed directions through one of the substrates 1, 2, of panel P as shown in FIG. 4, to periodically heat local regions of the epoxy thereby causing increased diffusion between fillet components 4a, 4b due to the enhanced Arrhenius effect (i.e. diffusion is related exponentially to the absolute temperature), as well as by way of the periodic thermal expansion and contraction of the epoxy fillet 4.

Figure 5:
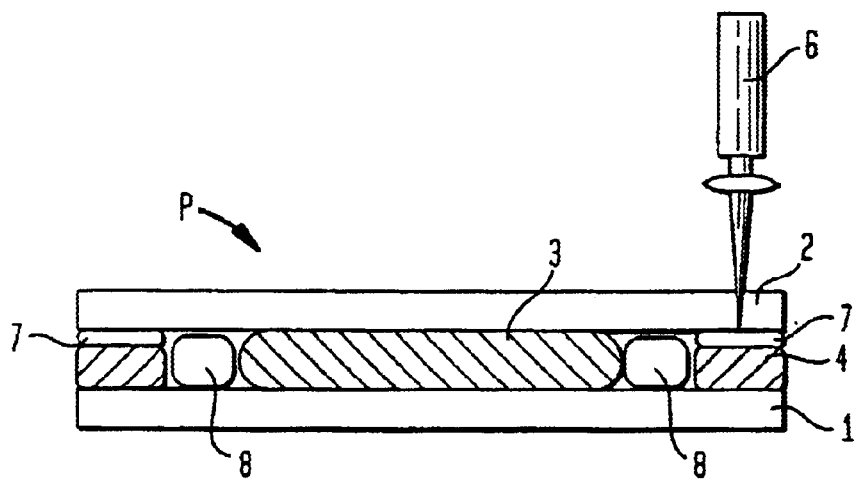
FIG. 5 is a schematic cross-sectional view of a step of using a laser to scan the peripheral fillet of epoxy material of FIG. 2 by directing the laser at an energy absorbing film deposited on one of the substrates adjacent the fillet of epoxy sealant.

In the preferred embodiment of FIG. 5 , a pulsed or CW laser 6 scans the peripheral edge of panel P formed by substrates 1, 2 over the region of the epoxy fillet 4. Here, the laser's energy can either be absorbed directly by the epoxy fillet 4 or absorbed by an adjacent thin energy absorbing film 7 deposited in the peripheral region of substrate 2 that is in direct contact with the epoxy fillet 4. Typically, a metal film 7 of a 500 Angstroms or more can act as an effective laser light absorber to rapidly transfer the absorbed thermal energy from the laser 6 to the epoxy fillet 4. As also shown in FIG. 5, a barrier fillet 8 is deposited in a continuous loop between the LC material 3 and the epoxy sealant fillet 4.

Figure 6:
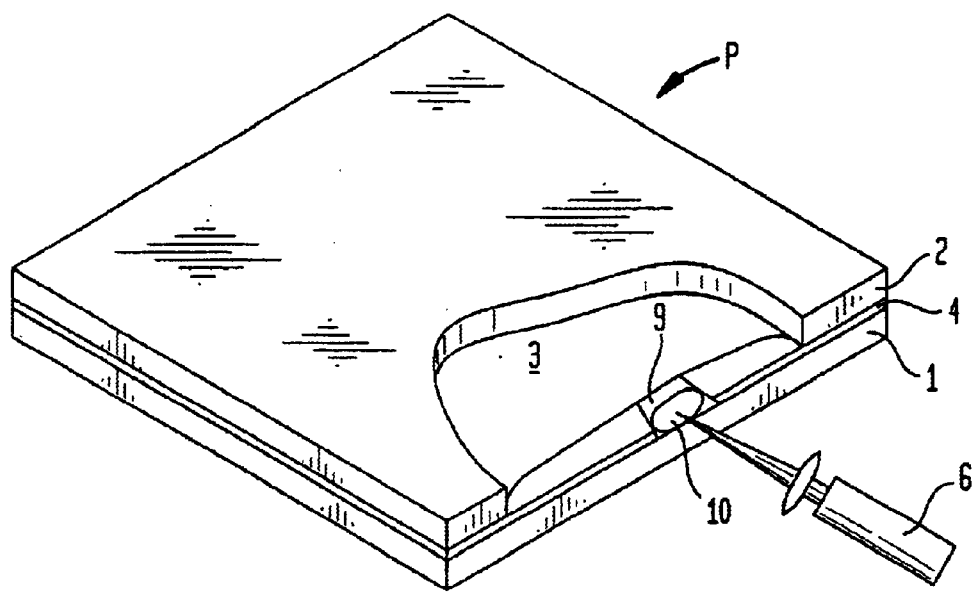
FIG. 6 is a schematic perspective view of a step of sealing an aperture provided to permit escape of excess LC material by placing a plug of epoxy material therein and irradiating the plug with a laser to cure the plug.

As shown in FIG. 6, the laser scanning can be achieved by directing the beam edge-on onto LCD panel P. In both cases (i.e. FIGS. 5 and 6), the laser can be stationary while the panel P is made to move, robotically for example, under the fixed laser. Advantageously, according to the invention a focused laser may be used to cause a short duration of high temperature of the epoxy followed by a much longer thermal relaxation time. Even though the heat is not applied steadily in this mode, the epoxy cure or cross-linking takes considerably less time at the higher temperatures (again an Arrhenius process) that can be achieved here without damage to the surroundings due to the very localized application of the laser's thermal energy. The use of pulse heating or rapid scanning of the peripheral region, which is required to cause local setting of epoxy fillet 4 by curing or cross-linking, minimizes the temperature rise of the surrounding regions. Thus, the epoxy fillet 4 can be heated without much transfer of heat to the liquid crystal 3 allowing for setting of epoxy fillet 4 without damage to the liquid crystal 3. For batch processing, a series of relatively inexpensive diode lasers operating in the near infrared can be used with one laser dedicated to each LCD panel under assembly. Alternatively, the beam from a single laser can be split into multiple beams and directed toward individual LCD panels by using mirrors.

A laser can also be used in curing fillets 4 comprising a uv epoxy or a special uv epoxy containing a thermally curable component. Here the pulsed or scanned laser methods are especially effective in cross-linking the thermal part of the epoxy not yet linked by uv radiation. With a uv laser (e.g. an excimer XeF laser), both thermal and uv components of the epoxy can be cross linked rapidly.

Moreover, to improve the cross-linking of an epoxy fillet, the laser would be scanned a multiple number of times along the periphery in a continuous mode so that the effective dwell time of the laser in any one spot would be equivalent to on the order of 1 millisecond. To speed up the curing cycle, the laser can be driven at higher intensities to permit higher peak temperatures as long as they are consistent with the maximum permissible curing temperatures. Also, of course it is important to keep the liquid crystal in contact with the epoxy from overheating. This can be accomplished by putting a lithographically placed barrier (such as barrier fillet 8 in FIG. 5) between the liquid and the epoxy as illustrated in the above-mentioned von Gutfeld application 09/197,004. Such a barrier prevents direct contact between the liquid crystal and the sealant thereby thermally isolating the liquid crystal from the heated epoxy during and after curing. Furthermore, to hasten curing and to reduce laser processing time, the panels can be raised to a temperature below which the liquid crystal 3 is adversely affected, for example 100C. The laser is then used to simply locally reach much higher temperatures along the epoxy fillet 4 only. This allows some initial curing of fillet 4 at the low temperatures with enhanced curing rates at the locally laser-induced pulsed temperatures.

FIG. 6 shows an embodiment in which a thermally cured epoxy fillet 4 has an aperture 8 to permit escape of a portion of the LC material 3 when substrates 1, 2 are pressed together to join them. The aperture 9 is then sealed with a plug 10 of uv epoxy material which is then hardened by irradiating the plug 10 with ultraviolet (uv) radiation from laser 6.

Figure 7:
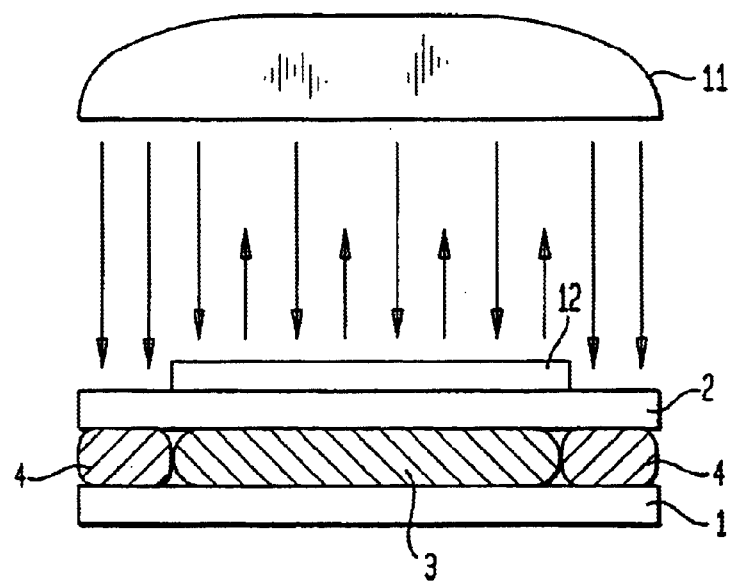
FIG. 7 shows a schematic cross-sectional view of a step of using an infrared lamp and a mask for the LC material to expose the epoxy fillet of FIG. 2.

Energy sources other than lasers can also be used to enhance setting, as by thermal curing, of fillets of epoxy sealant material. For example, FIG. 7 shows the use of a large angle flash lamp 11 to irradiate fillet 4 while shielding the LC material 3 with a mask 12. As shown, mask 12 may be a highly reflecting aluminized substrate that covers only the LC material 3 and leaves only a thermally settable epoxy fillet 4 exposed to radiation through a transparent (e.g. glass) substrate 2. Upon irradiation, only the parts not covered by the mask receive heat. With the appropriate pulsing of the lamp, thermal heating and thermal relaxation can be achieved locally to obtain cross linking of epoxy fillet 4 without damage to the surrounding regions. To localize the heating and permit higher temperatures to be achieved, the entire LCD panel can rest on a cooled platform to help in the removal of heat and allow for a larger temperature gradient to be established between the epoxy sealant fillet 4 and the lower substrate 1.

Figure 8:
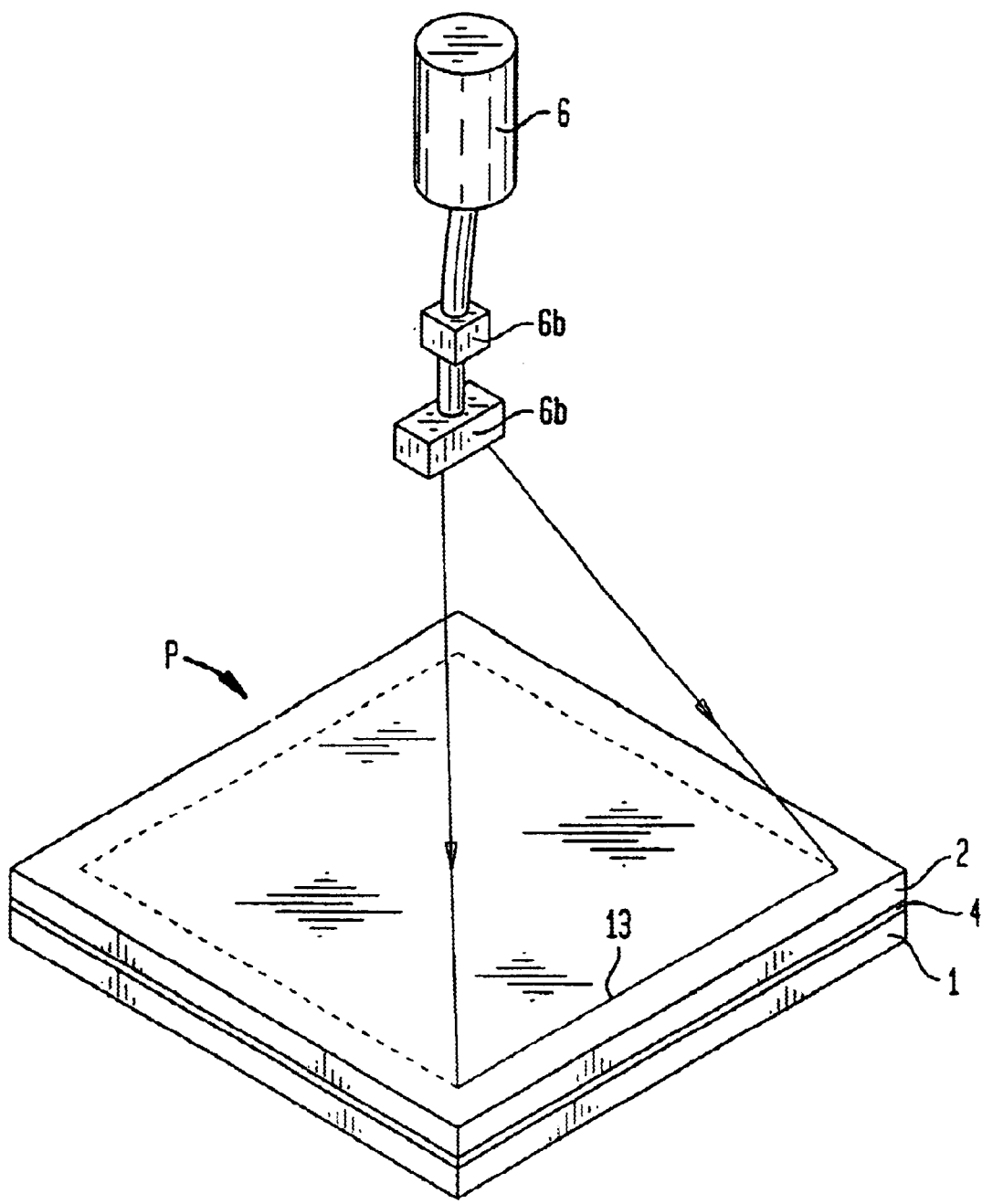
FIG. 8 is a schematic perspective view of a step of using a stationary laser to irradiate one entire linear segment side of a four-sided fillet rectangle

A preferred method of locally setting a fillet 4 of epoxy, typically one that is curable by uv light is to use a stationary (as opposed to scanning) excimer laser 6, as shown in FIG. 8, for example a XeF laser operating at 351–353 nm. The laser beam generally exits from laser 6 in a rectangular shape but is modified by focussing into a linear segment shaped image 13 by using one or more lenses 6a, 6b. The lens configuration can be made to result in a laser beam whose linear segment image 13 is equal in length to that of one fillet length of a substrate side. For example if the epoxy sealant fillet along one entire dotted side of substrate 2 is ½ mm in width and 2000 mm long the entire area to be set (cured) is 1000 square mm. Typically, for many uv expoxies the total required uv exposure to facilitate total setting or curing of the epoxy is on the order of 4 Joules/cm$^2$. It is therefore feasible to use a typical low power commercially available excimer laser, available for example from Lambda Physik Inc. of Fort Lauderdale, Fla., United States of America, with an output power of 20 watts supplied in short pulses. If this is focused into the above area of 1000 square mm or 10 square cm, the time it takes to cure this fillet 4 (excluding corrections for reflections) is given by the formula: Incident laser power/cm$^2$×time=energy/cm$^2$. Thus focussing the laser power onto one dotted fillet side provides the relation (20 W/10 cm$^2$)×(time)=4 Joules/cm$^2$. From this relation we see that the fillet 4 is set or cured in approximately 2.0 seconds. This compares with typical uv lamp setting times of several minutes, and even up to 10 minutes. Not only is the set or cure time greatly reduced using the excimer laser 6, but since the pulses from the laser 6 are very short, typically 20 ns, there is very little time for potentially damaging the LC material by lateral heat spread such as would occur if this high a power were delivered by a cw (continuous wave) laser.

Thus, the excimer laser 6 in the present configuration achieves both rapid set-times as well as preventing thermal spread from fillet 4 to the adjacent liquid crystal 3 (not shown in FIG. 8). Obviously, several lasers can be used to set/cure more than one side of fillet 4 at a time. Alternatively, mirrors can be used to split a more intense laser beam into several beams for simultaneous setting of more than one dimension.

It should be clear to those skilled in the art that light fibers can also be used to direct radiation from a laser or a high intensity pulsed flash lamp to the regions requiring heating or uv radiation. As will also be understood, the required wavelengths of laser beams used to initiate cross-linking will depend on the formulations of epoxy sealant that are to be used. In fact, where both cross-linking by uv light and thermally assisted curing by infrared are needed, a single infrared laser may suffice by frequency doubling or tripling part of its output which may be split off by a mirror. Other variations will become apparent to those skilled in the art.

While the present invention has been described with reference to preferred embodiments in order to facilitate a better understanding of the invention, those skilled in the art will recognize that the invention can be embodied in various ways without departing from the scope and spirit of the invention as set forth in the appended claims.

What is claimed is:

1. A method for forming a liquid crystal display panel, the method comprising:

depositing a first component of a two-component epoxy sealant in a continuous loop on a peripheral region of a first substrate, wherein the continuous loop surrounds a central region of the first substrate;

depositing a second component of the two-component epoxy sealant in a continuous loop on a peripheral region of a second substrate, wherein the continuous loop surrounds a central region of the second substrate;

depositing liquid crystal in a central region of any one of the first substrate and the second substrate;

placing the second substrate adjacent to the first substrate, wherein the peripheral region of the first substrate is disposed over the peripheral region of the second substrate and wherein the first component is in contact with the second component; and causing the first component and the second component of the two-component epoxy sealant to set, wherein the liquid crystal is hermetically sealed between the first substrate and the second substrate.

2. The method of claim 1, wherein the causing the first component and the second component of the two-component epoxy sealant to set includes scanning at least one of the first component and the second component of the two-component epoxy sealant with a laser beam.

3. The method of claim 2, wherein the causing the first component and the second component of the two-component epoxy sealant to set includes a thermal component in the epoxy sealant which is cured by the laser beam.

4. The method of claim 1, wherein the causing the first component and the second component of the two-component epoxy sealant to set, includes scanning with a laser beam a peripheral region of the first substrate on a side of the first substrate on which the first component of the two-component epoxy sealant is not deposited.

5. The method of claim 4, wherein depositing of the first component includes depositing on a peripheral region of the first substrate a film for absorbing energy.

6. The method of claim 1, wherein the causing the first component and the second component of the two-component epoxy sealant to set includes scanning the first component and the second component of the two-component epoxy sealant with a laser beam multiple times.

7. A system for forming a liquid crystal display panel, comprising:
  a first substrate on which is deposited a first component of a two-component epoxy sealant in a continuous loop on a peripheral region of the first substrate, wherein the continuous loop surrounds a central region of the first substrate;
  a second substrate on which is deposited a second component of the two-component epoxy sealant in a continuous loop on a peripheral region of the second substrate, wherein the continuous loop surrounds a central region of the second substrate;
  a liquid crystal which is deposited on a central region of any one of the first substrate and the second substrate;
  a device for placing the second substrate adjacent to the first substrate, wherein the peripheral region of the second substrate is disposed over the peripheral region of the second substrate and wherein the first component is in contact with the second component; and
  a laser beam for causing the first component and the second component of the two-component epoxy sealant to set, wherein the liquid crystal is hermetically sealed between the first substrate and the second substrate.

8. The system of claim 7, wherein the laser beam comprises:
  a laser beam for causing the first component and the second component of the two-component epoxy sealant to set, wherein the liquid crystal is hermetically sealed between the first substrate and the second substrate, by scanning with a laser beam a peripheral region of the first substrate on a side of the first substrate on which the first component of the two-component epoxy sealant is not deposited.

9. The system of claim 8, wherein the peripheral region of the first substrate on which the first component of the two-component epoxy sealant is deposited includes a film for absorbing energy.

10. The system of claim 1, wherein the laser beam comprises:
  a laser beam for causing the first component and the second component of the two-component epoxy sealant to set, wherein the liquid crystal is hermetically sealed between the first substrate and the second substrate, by scanning the first component and the second component of the two-component epoxy sealant with a laser beam multiple times.

11. The system of claim 2, wherein the epoxy sealant includes a thermal component which is cured by the laser beam.

* * * * *

UNITED STATES PATENT AND TRADEMARK OFFICE
CERTIFICATE OF CORRECTION

PATENT NO. : 6,636,290 B1 Page 1 of 1
DATED : October 21, 2003
INVENTOR(S) : James H. Glownia et al.

It is certified that error appears in the above-identified patent and that said Letters Patent is hereby corrected as shown below:

Column 8,
Line 31, from "claim 2" to -- claim 7 --

Signed and Sealed this

Second Day of March, 2004

JON W. DUDAS
*Acting Director of the United States Patent and Trademark Office*